Patented Oct. 9, 1934

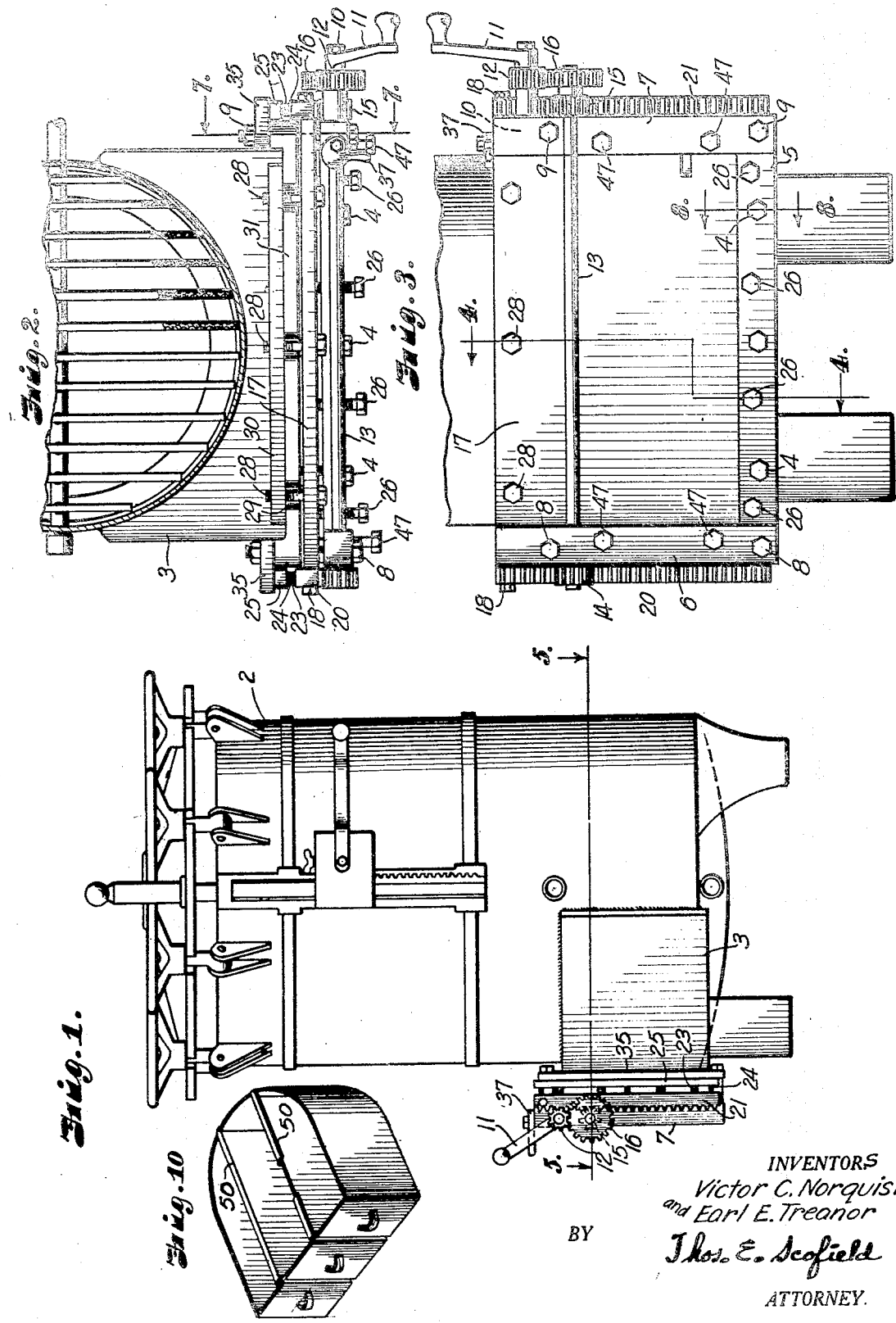

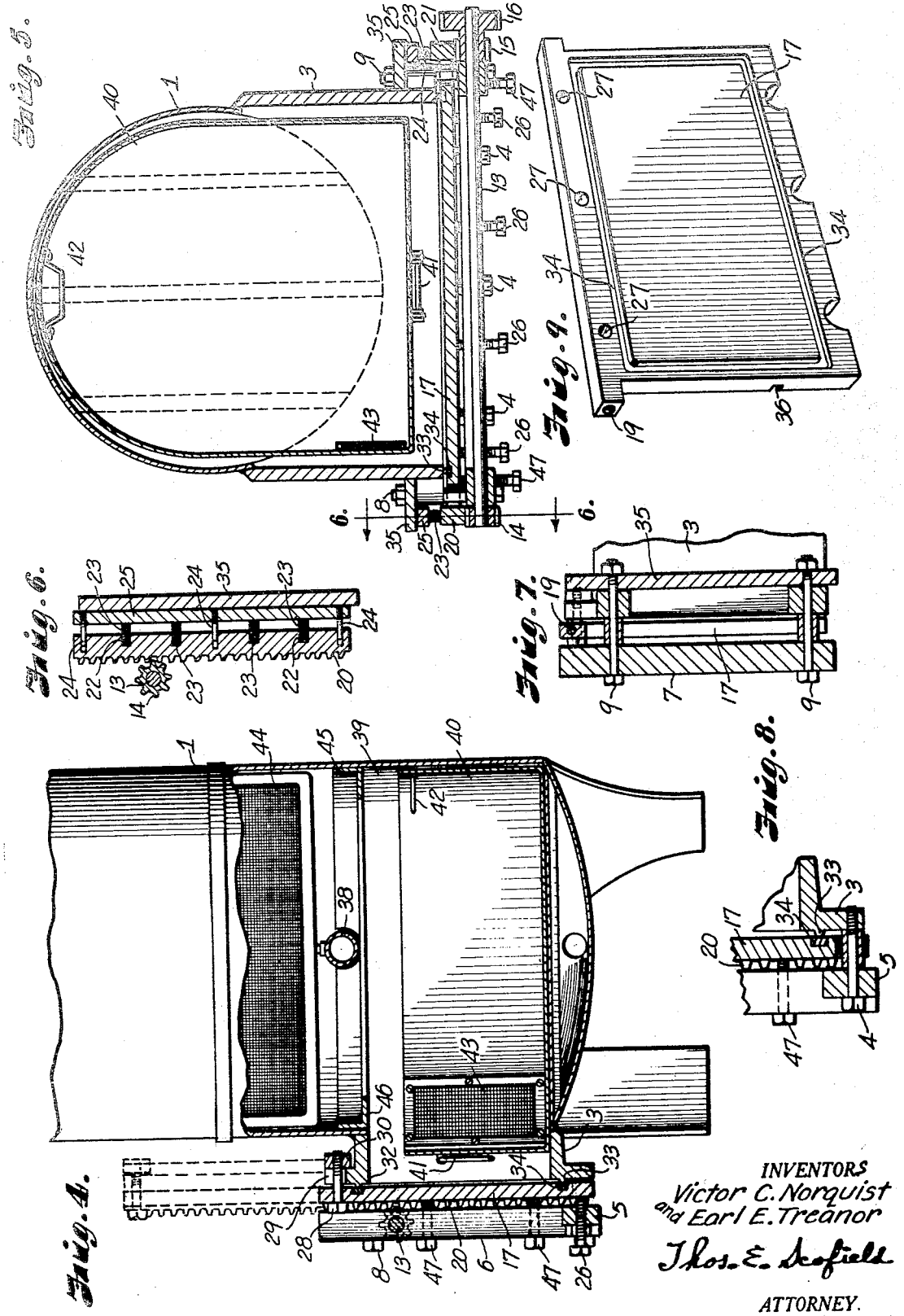

1,976,408

UNITED STATES PATENT OFFICE 1,976,408

FILTER

Victor C. Norquist and Earl E. Treanor, Kansas City, Mo., assignors to Butler Manufacturing Company, Kansas City, Mo., a corporation of Missouri Application August 15, 1932, Serial No. 628,828

3 Claims. (Cl. 210—182)

Our invention relates to an improvement in filters and more particularly to a filter clean-out construction.

In high pressure filters such as shown in our co-pending application, Serial No. 428,575, filed February 15, 1930, we show a method of cleaning the filter by a flushing arrangement in which the accumulated filter cake was broken up with a solvent before making a slurry which slurry was pumped from the filter during the operation of breaking up the spent filter cake. In this operation, a pump is run continuously and it was found that the passing of the filter aid and dirt through the pump gave the pump a very short life.

This application is a continuation-in-part of our co-pending application Serial No. 459,577.

One object of our invention is to provide a construction in which the sludge comprising filter aid and dirt, may be removed bodily without the aid of a pump.

Another object of our invention is to provide a sludge collecting pan, removable through a pressure tight door.

A further object of our invention is to provide a construction which will insure that the sludge falls entirely into the sludge collecting pan.

In general, our invention contemplates the provision of a sludge pan below the filter manifold provided with an open screen in one corner of the pan to permit the fluid to be drained from the slurry. A large clean-out door is provided in the front of the filter, which is about as wide as the filter bed. This clean-out door may be of any desired height depending on the amount of sludge and spent filter cake which is allowed to accumulate over a period of time. The door is operated by a rack mechanism and means are provided to insure a pressure tight closure when the filter is in operation.

In the accompanying drawings which form part of the instant specification and which are to be read in conjunction therewith, and in which like reference numerals are used to indicate like parts in the various views:

Figure 1 shows a side elevation of a filter provided with our clean-out device.

Figure 2 shows a plan view of the clean-out door and operating mechanism therefor, the filter body being partly in section.

Figure 3 shows a front elevation of the clean-out door of our invention.

Figure 4 shows a section taken on the line 4—4 of Figure 3.

Figure 5 shows a section taken on the line 5—5 of Figure 1.

Figure 6 shows a section taken on the line 6—6 of Figure 5.

Figure 7 shows a section taken on the line 7—7 of Figure 2.

Figure 8 shows a fragmentary sectional view taken on the line 8—8 of Figure 3.

Figure 9 shows a perspective view of the clean-out door per se.

Figure 10 shows a perspective view of a subdivided pan.

Referring now to the drawings, the filter comprises the usual filter container 1 provided with a pressure tight removable head closure 2. A saddle 3 is welded to the lower portion of the filter body 1. Bolted to the saddle 3 by bolts 4 is a horizontal member 5. Also bolted to the saddle 3 are a pair of vertical members 6 and 7, bolted to the saddle by means of bolts 8 and 9 respectively. The horizontal member 5 and the vertical members 6 and 7 form a U-shaped member as can best be seen in Figure 3. A stub shaft 10 is carried by vertical memer 7 and is provided with a crank 11 keyed thereto and a pinion 12. A shaft 13 is also journaled for rotation in vertical members 6 and 7 and has keyed thereto three pinions 14, 15 and 16 respectively. Pinion 16 engages pinion 12 of the stub shaft 10 so that, when the crank is turned, pinion 16 will be turned to rotate shaft 13 and hence pinions 14 and 15. Secured to the upper portion of the door 17 by means of stud bolts 18 which seat in threaded sockets 19 of the door 17 are a pair of racks 20 and 21, which engage the pinions 14 and 15 respectively. The rear portions of the racks are provided with a plurality of bores 22 for the reception of springs 23. The racks are also bored with openings for the reception of dowel pins 24 which are secured to sliding members 25 as can be readily seen in Fig. 6. The function of the springs and of the sliding members 25 is to keep the racks engaged with the respective pinions 14 and 15 while permitting the door 17 a degree of movement to permit sealing the door in pressure tight relationship to the saddle 3 in a manner which will be hereinafter more fully described.

Threaded through the horizontal member 5 are a plurality of bolts 26 which are adapted to engage the lower portion of the door 17. Threaded through threaded bores 27 of the door 17 are a plurality of bolts 28 which extend through notches 29 of the saddle member 3. The bolts 28 are threaded through a bar 30 which engage behind an upstanding ledge 31 of the saddle member so that when the bolts 28 are turned, the upper portion of the door will be pulled against the sealing groove 32 of the saddle member. Thus it will be seen that an actuation of the bolts 26 will push the lower portion of the door against the lower sealing groove 33 of the saddle member while the bolts 28 will pull the upper portion of the door against the sealing groove 32 of the saddle member. A gasket 34 is fitted in the periphery of the door 17 and adapted to engage the sealing grooves to form a pressure tight joint. When the bolts 26 and 28 are loosened, the springs 23 acting against the sliding members 25 which are in turn seated against members 35 secured to the saddle member, will push the door 17 forwardly away from its seat upon the saddle member. When the crank arm 11 is actuated to turn pinion 16 and shaft 13, pinions 14 and 15, engaging racks 20 and 21 will lift the door to its open position shown in the dotted line position in Figure 4. The door 17 is provided with a notch 36. Pivoted to the upright member 7 is a cam 37 which upon rotation is adapted to enter the notch 36 and hold the door in its open position.

Below the manifold 38 of the filter a compartment 39 is provided to which the door 17 gives access. Within this compartment is positioned a sludge collecting pan 40 provided with suitable handles 41 and 42 to enable the removal thereof through the door opening. One side of the sludge pan 40 is fitted with a Monel metal screen 43 to enable the fluid of the collected slurry and sludge to drain from the pan. Immediately below the filter screen 44 of the filter and above the compartment 39, a peripheral angle bar 45 is welded to the casing 1 of the filter proper. The shoulder 46 of the angle bar prevents any of the sludge, filter aid and dirt washed from the filter screen 44 from falling beyond the sludge pan 40 but directs the sludge into the sludge pan. The vertical members of the U-shaped frame are provided with bolts 47 which act similarly to bolts 26 in pushing the door against its seat.

In operation, after the filter has been run for a suitable time so that there is considerable dirt collected on the filter screens and it is desired to clean the same, the pressure tight head 2 of the filter is removed. The dirt and sludge are scraped from the filter screens and flushed therefrom by means of a solvent until the screens are thoroughly cleaned. During this operation the sludge and dirt are washed downwardly and fall into the sludge pan 40. The channel member 45 and its shoulder 46 prevents the sludge from falling inward but into the sludge pan. The bolts 26, 28 and 47 are loosened allowing the springs 23 to push the door away from its seat. The crank 11 is then actuated to allow the door to be raised by means of the pinions 14 and 15 and the racks 20 and 21 to its open position where it is secured thus open by means of cam 37 being seated in the notch 36 of the door. Sufficient time is allowed to permit the liquid in the sludge to drain therefrom through the drain screen 43. The pan is then removed with its sludge content and a new pan is inserted. The cam 37 is then released and the door is allowed to move to its closed position. The bolts 28 are then actuated to pull the upper portion of the door against its seat and the bolts 47 and 26 are actuated to push the sides and lower portion of the door against its seat to form a pressure tight joint. The head is closed in pressure tight position and the filter is again ready for operation.

It will be perceived that our construction has many advantages. The operation above described requires from five to seven minutes as contrasted with the old operation of breaking up the accumulated sludge which required anywhere from fifteen to twenty minutes and in some cases longer, due to the fact that the sludge is apt to stop the pump and clog the line. The life of the pump is considerably lengthened and a smaller amount of solvent is necessary to perform the cleaning. The door of our invention provides a pressure tight joint while, at the same time, being readily opened to permit the removal of the sludge pan. The sludge pan collects the sludge and permits the solvent to drain therefrom so that the removal of the sludge pan is rendered easier. The angle baffle 46 prevents any dirt from falling behind the pan and renders subsequent flushing unnecessary.

With larger filters a single pan may be awkward to handle. Accordingly, we may subdivide the pan into a plurality of smaller pans, as shown in Figure 10. The middle pan in the modification shown in Figure 10 is provided with flanges 50 adapted to overlap the edges of adjoining pans to prevent the sludge from falling into the interpan spaces.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A pressure filter including in combination a casing, a plurality of filter screens positioned within said casing, a pan below said screen adapted to collect sludge, an annular baffle within said casing for directing sludge into said pan, and a door in said casing for permitting the removal of the pan.

2. A pressure filter including in combination a casing, filter screen within said casing, a sludge pan below said filter screens, a door for the removal of said pan, a drain opening in said pan and a screen in said opening adapted to permit the drainage of fluid from the sludge in said pan.

3. A pressure filter including in combination a casing, a plurality of filter screens positioned within said casing, a plurality of pans below said screen adapted to collect sludge, an annular baffle within said casing for directing sludge into said pans, a door in said casing for permitting the removal of the pans, and means carried by at least one of said pans to prevent sludge from falling into the interpan space.

VICTOR C. NORQUIST.
EARL E. TREANOR.